US006975883B1

(12) United States Patent
Richter

(10) Patent No.: US 6,975,883 B1
(45) Date of Patent: Dec. 13, 2005

(54) DEVICE FOR PROTECTING THE INITIAL UTILIZATION OF A PROCESSOR /CHIP CARD

(75) Inventor: Oliver Richter, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 09/926,460

(22) PCT Filed: May 9, 2000

(86) PCT No.: PCT/EP00/04141

§ 371 (c)(1),
(2), (4) Date: Jan. 28, 2002

(87) PCT Pub. No.: WO00/69204

PCT Pub. Date: Nov. 16, 2000

(30) Foreign Application Priority Data

May 10, 1999 (DE) ................................ 199 21 524

(51) Int. Cl.⁷ ............................ H04B 1/38; H04M 1/00
(52) U.S. Cl. .................. 455/558; 455/410; 455/411; 455/418; 455/420; 379/357.01; 379/357.02; 235/380; 713/200; 713/202
(58) Field of Search .................. 455/410, 411, 418, 455/420, 55.01, 558, 569.1; 379/357.01, 379/357.02, 357.05

(56) References Cited

U.S. PATENT DOCUMENTS

| | | | |
|---|---|---|---|
| 5,724,423 A | | 3/1998 | Khello |
| 5,757,918 A | * | 5/1998 | Hopkins ..................... 705/67 |
| 5,842,124 A | * | 11/1998 | Kenagy et al. ............. 455/418 |
| 5,875,404 A | * | 2/1999 | Messiet ..................... 455/558 |
| 5,907,804 A | * | 5/1999 | Schroderus et al. ........ 455/411 |
| 6,012,634 A | * | 1/2000 | Brogan et al. ............. 235/380 |
| 6,085,081 A | * | 7/2000 | Leskinen .................... 455/406 |
| 6,179,205 B1 | * | 1/2001 | Sloan ......................... 235/382 |
| 6,314,519 B1 | * | 11/2001 | Davis et al. ............... 713/200 |
| 6,367,011 B1 | * | 4/2002 | Lee et al. .................. 712/172 |
| 6,480,725 B2 | * | 11/2002 | Cassidy et al. ............ 455/558 |

FOREIGN PATENT DOCUMENTS

| | | |
|---|---|---|
| DE | 19527715 | 1/1997 |
| DE | 19818998 A1 | 11/1999 |
| DE | 19820422 A1 | 11/1999 |
| EP | 1002440 B1 | 5/2000 |
| WO | WO 98/57511 | 12/1998 |

OTHER PUBLICATIONS

Abstract of DE19818998, http://v3.espacenet.com/textdoc?DB=EPODOC&IDX=DE19818998&F=O, esp@cenet Ansicht, Nov. 10. 2004.
Abstract of DE19820422, http://v3/espacenet.com/textdoc?DB=EPODOC&IDX=DE19820422&F=O, esp@cenet Ansicht, Nov. 10. 2004.

* cited by examiner

Primary Examiner—Stephen D'Agosta
(74) Attorney, Agent, or Firm—Bacon & Thomas, PLLC

(57) ABSTRACT

A method for putting into operation a processor smart card in a network for communication, preferably in a GSM network, wherein the card user must identify himself with respect to the processor smart card (SIM) by a personal identification number. An application is stored on the smart card to control the execution upon the first use of the processor smart card by the card user. The application is used to transmit an indication of the first use to the card user. The application is arranged to transmit personal identification numbers for subsequent use of the processor smart card in the network to the first user of the card or to let them be defined by the first user of the card.

6 Claims, 1 Drawing Sheet

DEVICE FOR PROTECTING THE INITIAL UTILIZATION OF A PROCESSOR /CHIP CARD

This application is a National Stage application of PCT/EP00/04141 filed May 9, 2000 and claims the benefit of priority of DE 199 21 524.3 filed May 10, 1999.

BACKGROUND

This invention relates to a method for protection from attacks on a processor smart card or from its unauthorized use in a network for communication, preferably a GSM network, according to the preamble of claim 1, and to a corresponding smart card according to the preamble of claim 9.

In GSM systems it is known that for using the smart card (Subscriber Identity Module SIM) the card user must first identify himself as a legitimate user by means of a Personal Identification Number (PIN). To avoid abuse at this point it is known to transmit the PIN to the card user by having PIN/PUK letters produced by the card manufacturer or card personalizer and handing over said PIN/PUK letters to the card user.

Another, system-relevant security measure is the sealing of the PIN/PUK letter by the card manufacturer or card personalizer. The intactness of the seal on the PIN/PUK letter indicates to the card user that the secret numbers applied to the PIN/PUK letter by the card manufacturer cannot be known to any other card user. Since the secret numbers on the PIN/PUK letter were chosen randomly by the card manufacturer or card personalizer and are stored only in the secret memory of the SIM card, the card user can assume that by opening the PIN/PUK letter only he himself acquires knowledge of the secret numbers.

To avoid abuse upon PIN entry, it is known for PIN entry to provide an error counter that temporarily prevents further use of the card when a permissible number of abortive attempts is exceeded. To protect from unnecessary blocking of a card by inadvertent false entry of the PIN, it is known to provide on the card a Personal Unblocking Key (PUK) which can be used to define a new PIN and which reenables the card for use in the network. To avoid abuse upon PUK entry, it is known to provide an error counter which definitively prevents further use of the card when a permissible number of abortive attempts is exceeded.

In the known prior art, the card user is given the possibility of replacing the PIN defined by the card manufacturer or card personalizer by a self-chosen value. The value of the PUK cannot be changed by the card user. To be able to inform the card user of the PUK if the PIN/PUK letter is lost or inaccessible but the PIN inadvertently blocked, it is known to store the PUK additionally in a data base centrally with the network operator for all issued cards as a special service in some GSM networks. At the card user's request and after a check of the card user's identity, the PUK is transmitted to the card user for enabling the PIN.

Such a system also involves the danger that, by unauthorized opening of the PIN/PUK letter and for example by reprinting of the PIN/PUK letter or by manipulation of the PIN/PUK letter seal, the legitimate card user believes that he is the first user of the card although an illegitimate card user has already put the card into operation temporarily at the expense of the legitimate card user.

SUMMARY

It is therefore the problem of the invention to provide a safe method for protection from unnoticed opening of PIN/PUK letters by which the first user of the card is notified of the first use of the card, as well as a corresponding smart card.

The invention relates to a method for checking and displaying the first use of a processor smart card by means of an additional application on the processor smart card itself which controls or at least substantially influences all steps necessary for a safe check.

An advantageous embodiment of the invention shows the use of the application to let the card user define secret keys required for authentication of the card user with respect to the card, or to transmit said keys to the card user, whereby the card remains transport-protected on the way between card manufacturer, card issuer and card user.

Another advantageous use of the invention is the supplementing or replacement of elaborate and sometimes cost-intensive methods for transport protection of processor smart cards between card manufacturer and card user, for example PIN/PUK letters, by the additional application in the processor smart card which supplements or substantially performs the function of a PIN/PUK letter.

According to another advantageous embodiment, the invention can also be used as a component of a system executed in essential parts in the processor smart card itself for individual allocation and personalization of secret keys which are to be made accessible not only to the card user but also to the card issuer, e.g. a mobile phone network operator or network service provider.

Another advantageous embodiment of the invention provides that when the secret keys are defined by the card user himself, said secret keys are asked for several times by the card user in order to avoid inadvertent false entry.

Alternatively or additionally, after the secret numbers have been defined by the card user or by the card itself a corresponding network component can be sent a message after which the first use of the card in the network is communicated or the value of the secret number transmitted.

According to another advantageous embodiment of the invention, when the card is first put into operation the secret numbers are additionally or alternatively inputted or outputted via the speaking or hearing apparatus of the mobile phone device, which can in particular facilitate and better protect the transmission or definition of secret keys to or by visually handicapped card users.

DETAILED DESCRIPTION OF VARIOUS EMBODIMENTS

Figure 1:
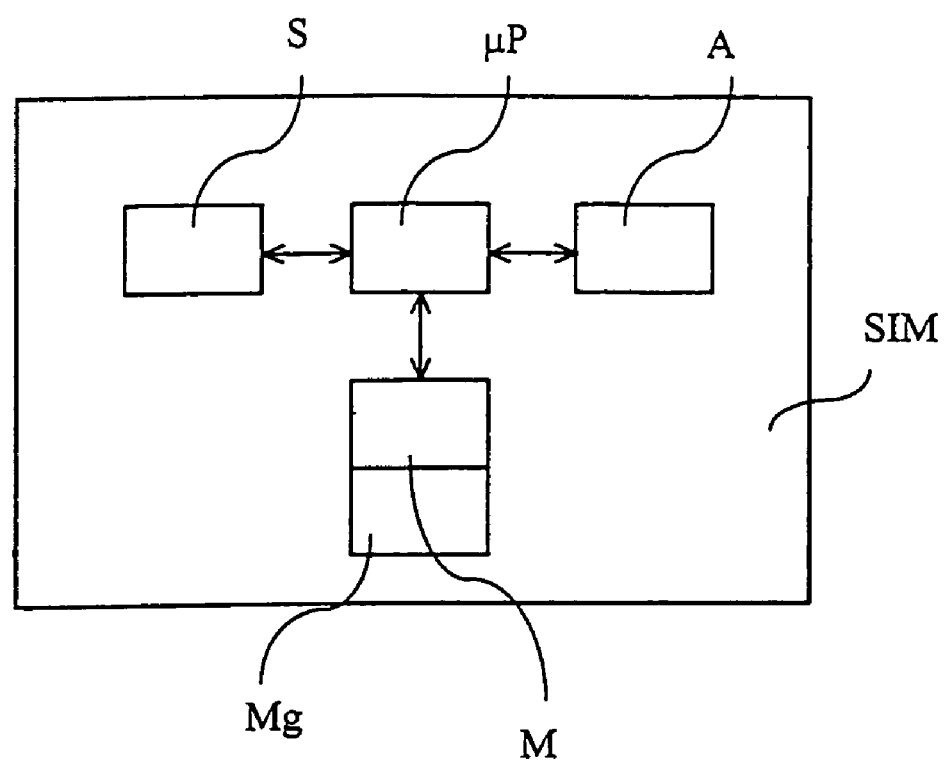
FIG. 1 is a schematic view of an embodiment of a smart card according to the invention.

FIG. 1 shows an example of smart card SIM having interface S for data exchange with a mobile phone and microprocessor up connected with application A and memory M, Mg. Application A can be formed substantially as a SIM Application Toolkit application and has been incorporated into the card by the card manufacturer or card personalizer. The memory is divided into usual memory area M where data can be read and written, and secret memory area Mg where at least the information about the first use of the smart card is stored. When the card is put into operation by a card user via interface S, the application checks by accessing secret memory Mg whether this is the first use of the card.

Upon the first use of the card, the card user is informed by application A and asked to confirm the putting into operation of the card. Upon positive confirmation by the card user, the application changes the information about first use in secret memory Mg, thereby changing its behavior when the card is put into operation again later.

What is claimed is:

1. A method for putting into operation a processor smart card for a network for communication, wherein the card user is identified with respect to the processor smart card by a personal identification number, the method comprising the steps of:

for execution control of the first use, the processor smart card is first provided with an additional application for preventing use in the network, and allowing only local use by means of a card reader or card terminal, and upon the first use of the processor smart card, the additional application outputs without a further check of a secret number a display signal for the first use and a request for confirmation, and after receiving a confirmation signal the additional application is deactivated or its execution so changed that upon the next use of the card a display signal is outputted to indicate that the card has already been put into operation and the use of the processor smart card in the network is enabled;

wherein a personal identification number previously defined must be inputted for activating the additional application; and wherein at least some personal identification numbers on the card are predetermined and personalized on the processor smart card, and said numbers are indicated upon the first use for later use on the card reader or card terminal.

2. The method according to claim 1, wherein the entry of a personal identification number and/or a secret number for changing or unblocking the personal identification number is requested after the first use of the card and prior to the deactivation or change of state of the additional application.

3. The method according to claim 1, wherein at least some personal identification numbers on the card are set by a random-number generator built into the card and said numbers are indicated during the first use on the card reader or card terminal.

4. The method according to claim 1, wherein at least some personal identification numbers are combined for transmission to the network in encrypted form via a data channel, and sent immediately or at a later time to a central place at the network operator or network service provider.

5. The method according to claim 1, wherein the secret numbers to be defined at the first putting into operation are used not for the purpose of protecting the network application but for protecting an additional application on the smart card.

6. The method according to claim 1, wherein information, on the first use of the processor smart card and on the personal identification numbers, is outputted or inputted via the hearing or speaking devices of the card reader or the card terminal.

* * * * *